US012794045B2

(12) United States Patent
Yoon

(10) Patent No.: US 12,794,045 B2
(45) Date of Patent: Nov. 10, 2026

(54) BATTERY MODULE

(71) Applicant: Samsung SDI Co., Ltd., Yongin-si (KR)

(72) Inventor: Ji Hyeong Yoon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 373 days.

(21) Appl. No.: 17/217,977

(22) Filed: Mar. 30, 2021

(65) Prior Publication Data

US 2021/0320345 A1 Oct. 14, 2021

(30) Foreign Application Priority Data

Apr. 13, 2020 (KR) ........................ 10-2020-0044756

(51) Int. Cl.
*H01M 10/658* (2014.01)
*H01M 10/6555* (2014.01)

(52) U.S. Cl.
CPC ..... *H01M 10/658* (2015.04); *H01M 10/6555* (2015.04)

(58) Field of Classification Search
CPC ............. H01M 10/647; H01M 10/655; H01M 10/6555; H01M 10/658; H01M 10/659; H01M 10/6569; F28D 20/023; Y02E 60/10
See application file for complete search history.

(56) References Cited

U.S. PATENT DOCUMENTS

| | | | |
|---|---|---|---|
| 10,847,850 B2 | 11/2020 | Choi | |
| 2010/0028758 A1 | 2/2010 | Eaves et al. | |
| 2011/0003152 A1* | 1/2011 | Grey | B01J 13/14 510/438 |
| 2012/0135281 A1 | 5/2012 | Choi et al. | |

(Continued)

FOREIGN PATENT DOCUMENTS

| | | |
|---|---|---|
| CN | 105742733 A | 7/2016 |
| CN | 105742755 A | 7/2016 |

(Continued)

OTHER PUBLICATIONS

Machine translation of Japanese Patent Publication No. 2010-053196, published Mar. 11, 2010. (Year: 2010).*

(Continued)

*Primary Examiner* — Miriam Stagg
*Assistant Examiner* — Lilia Nedialkova
(74) *Attorney, Agent, or Firm* — Womble Bond Dickinson (US) LLP

(57) ABSTRACT

A battery module includes a phase change material in an insulation sheet to absorb heat and reduce thermal conductivity, thereby preventing or reducing heat transfer between battery cells, and delaying, preventing, or reducing an event that may be caused by the heat. As an example, the battery module includes a plurality of battery cells and a plurality of insulation sheets interposed between the plurality of battery cells, where each of the insulation sheets includes a heat-insulating sheet having a first surface and second surface, a plurality of through-holes defined in the heat-insulating sheet and passing between the first surface and the second surface opposite the first surface, and a phase change material filled in the plurality of through-holes.

15 Claims, 10 Drawing Sheets

(56) References Cited

U.S. PATENT DOCUMENTS

| | | | | |
|---|---|---|---|---|
| 2016/0248135 | A1* | 8/2016 | Kim | H01M 10/625 |
| 2016/0369936 | A1 | 12/2016 | Hwang | |
| 2017/0149103 | A1* | 5/2017 | Yang | H01M 10/6556 |
| 2017/0222283 | A1 | 8/2017 | Choi | |
| 2020/0099024 | A1* | 3/2020 | Ryu | H01M 50/553 |
| 2020/0287252 | A1 | 9/2020 | Li et al. | |
| 2021/0083342 | A1* | 3/2021 | Ryu | H01M 50/105 |
| 2021/0091428 | A1 | 3/2021 | Naito et al. | |

FOREIGN PATENT DOCUMENTS

| | | | |
|---|---|---|---|
| CN | 205406680 | U | 7/2016 |
| CN | 205595422 | U | 9/2016 |
| CN | 106252787 | B | 12/2016 |
| CN | 107579306 | A | 1/2018 |
| CN | 207587926 | U | 7/2018 |
| CN | 109420281 | A | 3/2019 |
| CN | 109821181 | A | 5/2019 |
| CN | 208835235 | U | 5/2019 |
| CN | 110433419 | A | 11/2019 |
| EP | 3 223 357 | A1 | 9/2017 |
| JP | 2010-097693 | A | 4/2010 |
| JP | 2010053196 | A | 3/2019 |
| KR | 10-2007-0003856 | A | 1/2007 |
| KR | 10-1765300 | B1 | 8/2017 |
| KR | 10-1788653 | B1 | 10/2017 |
| WO | WO 2019/187313 | A1 | 10/2019 |
| WO | WO 2020/055004 | A1 | 3/2020 |

OTHER PUBLICATIONS

Cameron, N.M. and Rapp, C.F., “Fiberglass”, Encyclopedia of Materials: Science and Technology, 2001. (Year: 2001).*

Office Action dated Nov. 2, 2022 of the Chinese Patent Application No. 202110394014.6 (8 pages).

EPO Extended Search Report dated Sep. 14, 2021, issued in EP Patent Application No. 21168082.2, 8 pages.

Chinese Office Action, Application No. 202110394014.6 dated Oct. 12, 2023, 9 pps.

Notice of Allowance, Jul. 15, 2024, Chinese Patent Application No. 202110394014.6, 5 pps.

Notice of Allowance, corresponding to European Application No. 21168082.2, dated Aug. 26, 2026, 8 pages.

* cited by examiner

BATTERY MODULE

CROSS-REFERENCE TO RELATED APPLICATION

This application claims priority to and the benefit of Korean Patent Application No. 10-2020-0044756 filed in the Korean Intellectual Property Office on Apr. 13, 2020, the entire content of which is incorporated herein by reference.

BACKGROUND

1. Field

One or more aspects of embodiments of the present disclosure relate to a battery module.

2. Description of the Related Art

Generally, an electronic device (such as a laptop computer, a mini laptop computer, a netbook, a mobile computer, an ultra-mobile personal computer (UMPC), and/or a portable multimedia player (PMP)) uses a battery pack, in which a plurality of battery cells are connected to each other in series and/or parallel, as a portable power source.

In recent years, in order to prevent or reduce environmental contamination, interest in electric vehicles and electric hybrid vehicles has increased, and a battery module in such vehicles may include a plurality of battery cells that are suitably connected to each other in series. In the battery module, if a spaced interval (e.g., spacing) between the battery cells is increased so as to accommodate (e.g., reduce) a risk or occurrence of swelling of the battery cells (which may be caused while the battery module is charged and discharged), the heat-insulating performance of the battery cells may be deteriorated, or the size of the battery module may excessively increase.

The above information is provided only to enhance understanding of the background of the described technology, and may not be prior art.

SUMMARY

One or more aspects of embodiments of the present disclosure are directed toward a battery module that absorbs heat through a phase change material provided in an insulation sheet and reduces thermal conductivity to prevent or reduce heat transfer between battery cells, and thereby delay and prevent or reduce an event (e.g., a failure or damage event) that may occur due to the heat.

One or more embodiments of the present disclosure provide a battery module including: a plurality of battery cells; and a plurality of insulation sheets interposed between the plurality of battery cells, wherein each of the insulation sheets includes a heat-insulating sheet having a first surface and a second surface, a plurality of through-holes defined therein (e.g., in the heat-insulating filled in the plurality of through-holes sheet) and passing between the first surface and the second surface opposite the first surface, and a phase change material.

The insulation sheet may further include a plurality of protective films attached to the first surface and the second surface of the heat-insulating sheet to cover the phase change material exposed at the first surface and the second surface of the heat-insulating sheet.

The phase change material may be inserted into (e.g., filled in) each of the plurality of through-holes defined in the heat-insulating sheet in the form of a bundle (e.g., a corresponding plurality of bundles) surrounded by the protective film.

The protective film may be made of the same material (e.g., be the same in material) as a separator.

The protective film may be provided as a single layer made of polyethylene (PE) or as a composite layer made of polyethylene (PE) coated with polypropylene (PP) or ceramic on both surfaces of the polyethylene (PE).

The protective film(s) may have sizes and shapes corresponding to the first surface and/or the second surface of the heat-insulating sheet (respectively), and may be attached through an adhesive and/or thermal pressing to cover the entire first surface and/or the entire second surface of the heat-insulating sheet, respectively.

The phase change material may be provided in the form of a capsule surrounded by paraffin wax to absorb heat while a fire extinguishing agent is melted (e.g., to absorb heat, and to optionally melt to release a fire extinguishing agent).

The heat-insulating sheet may be made of ceramic or mica.

One or more embodiments of the present disclosure provide a battery module including: a plurality of battery cells, each including an embedded electrode assembly, each embedded electrode assembly including a positive electrode plate, a negative electrode plate, and a separator, the plurality of battery cells being arranged with each other along a longitudinal direction thereof so that long side surfaces thereof are parallel to each other (e.g., face each other or face away from each other); and a plurality of insulation sheets interposed between long side surfaces of the plurality of battery cells, wherein each of the insulation sheets includes: a heat-insulating sheet having a first surface and a second surface opposite the first surface; and a plurality of phase change materials attached to the first surface and the second surface of the heat-insulating sheet in the form of a bundle surrounded by protective films, the protective films being attached to cover the first surface and the second surface of the heat-insulating sheet (respectively).

The protective films may each be made of the same material as the separator (e.g., may each be the same in material as the separator), and the phase change material may be provided in the form of a capsule surrounded by paraffin wax to absorb heat while a fire extinguishing agent is melted.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain principles of the present disclosure. In the drawings.

DETAILED DESCRIPTION

Figure 1A:
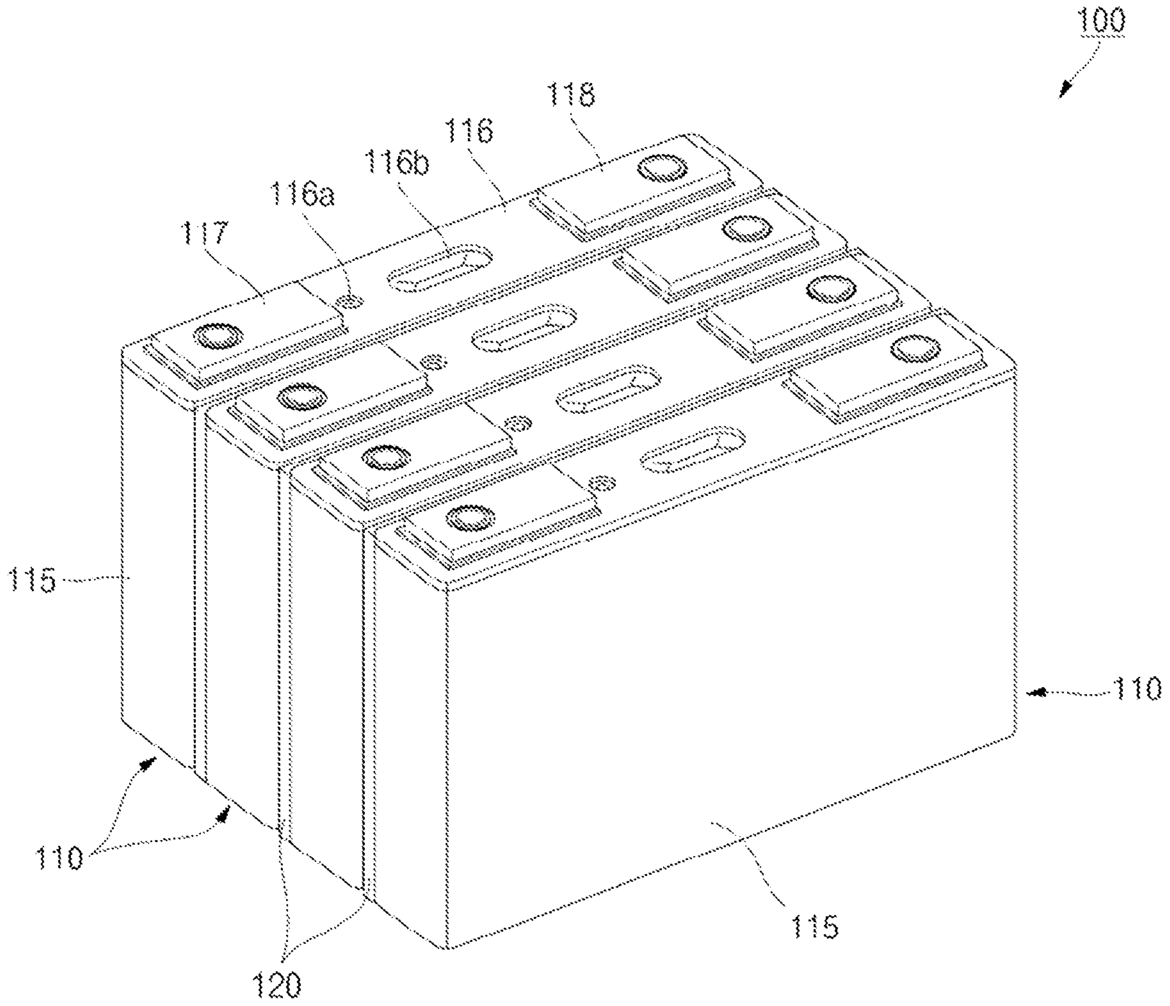
FIGS. 1A and 1B are a perspective view and an exploded perspective view of a battery module according to an embodiment, respectively.

Hereinafter, selected embodiments will be described in more detail with reference to the accompanying drawings.

The present disclosure may, however, be embodied in many different forms and should not be construed as being limited to the embodiments set forth herein; rather, these embodiments are provided so that those skilled in the art may thoroughly understand the present disclosure. Further, these embodiments are provided so that this disclosure will be thorough and complete, and will fully convey the scope of the present disclosure to those skilled in the art.

In the drawings, the dimensions of layers and regions may be exaggerated for clarity of illustration. Like reference numerals refer to like elements throughout, and duplicative descriptions thereof may not be provided. As utilized in this specification, the term "and/or" includes any and all combinations of one or more of the associated listed items. In this specification, it will be understood that when a member A is referred to as being connected to a member B, the member A can be directly connected to the member B or indirectly connected to the member B with a member C therebetween. In contrast, when a member A is referred to as being directly connected to a member B, there are no elements between member A and member B The terms utilized herein are for illustrative purposes of the present disclosure only and should not be construed as limiting the meaning or the scope of the disclosure. As utilized in this specification, a singular form may, unless definitely indicating a particular case in terms of the context, include a plural form. Also, the expressions "comprise/include" and/or "comprising/including" utilized in this specification neither define (limit) the mentioned shapes, numbers, steps, operations, members, elements, and/or groups of these, nor exclude the presence or addition of one or more other different shapes, numbers, steps, operations, members, elements, and/or groups of these, or addition of these.

As utilized in this specification, terms such as "first," "second," etc. are utilized to describe various members, components, regions, layers, and/or portions. However, the members, components, regions, layers, and/or portions are not wholly defined by these terms. The terms do not imply a set or particular order, up and down, or superiority, and are utilized only for distinguishing one member, component, region, layer, or portion from another member, component, region, layer, or portion.

Thus, a first member, component, region, layer, or portion may also be referred to a second member, component, region, layer, or portion, without departing from the teaching of the present disclosure.

Spatially relative terms, such as "below", "beneath", "lower", "above", "upper" and the like, may be utilized herein for ease of description to describe one element or feature's relationship to another element(s) or feature(s) as illustrated in the drawings. These spatially relative terms are intended for easy comprehension of the present disclosure according to various process or usage states, and thus, the present disclosure is not limited thereto. For example, an element or feature shown in the drawings is turned inside out, the element or feature described as "beneath" or "below" may change into "above" or "upper". Thus, the term "below" may encompass the term "above" or "below".

As used herein, the singular forms "a," "an," and "the" are intended to include the plural forms as well, unless the context clearly indicates otherwise. As used herein, expressions such as "at least one of," "one of," and "selected from," when preceding a list of elements, modify the entire list of elements and do not modify the individual elements of the list. Further, the use of "may" when describing embodiments of the present disclosure refers to "one or more embodiments of the present disclosure".

Figure 1B:
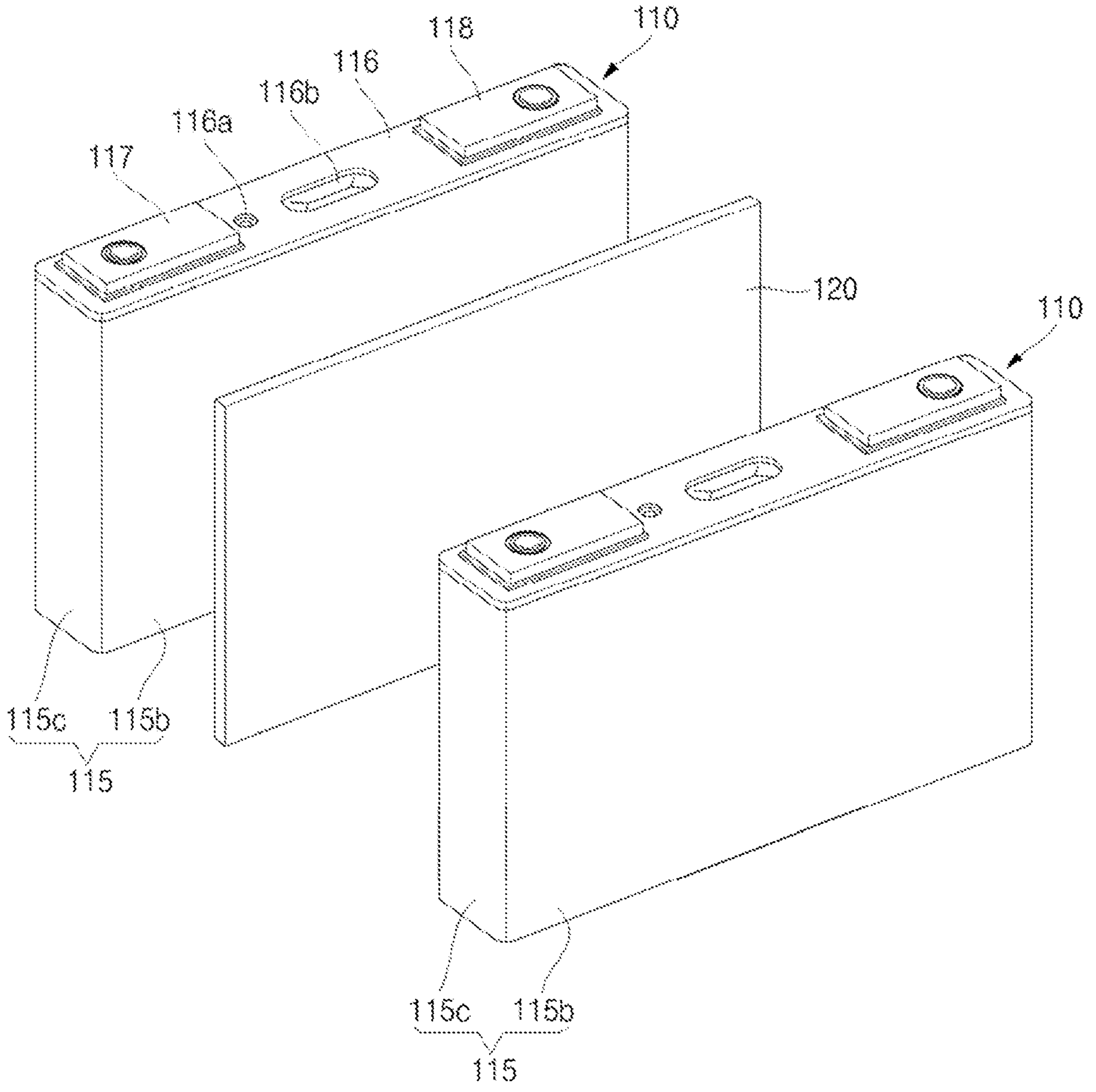

FIG. 1A is a perspective view of a battery module according to an embodiment, and FIG. 1B is a partially exploded perspective view illustrating a portion of the battery module of FIG. 1A.

As illustrated in FIGS. 1A and 1B, a battery module 100 may include a plurality of battery cells 110 and a plurality of insulation sheets 120. Further, the plurality of battery cells 110 and the plurality of insulation sheets 120 may be disposed to alternate with respect to each other (e.g., may be interposed). In some embodiments, the battery module 100 (in which the plurality of battery cell 110 and the plurality of insulation sheets 120 are alternatingly stacked along one direction) may be further provided with (an) end plate(s) configured to fix the plurality of battery cells 110 and the plurality of insulation sheets 120 at one or both side ends of the stack.

Figure 2:
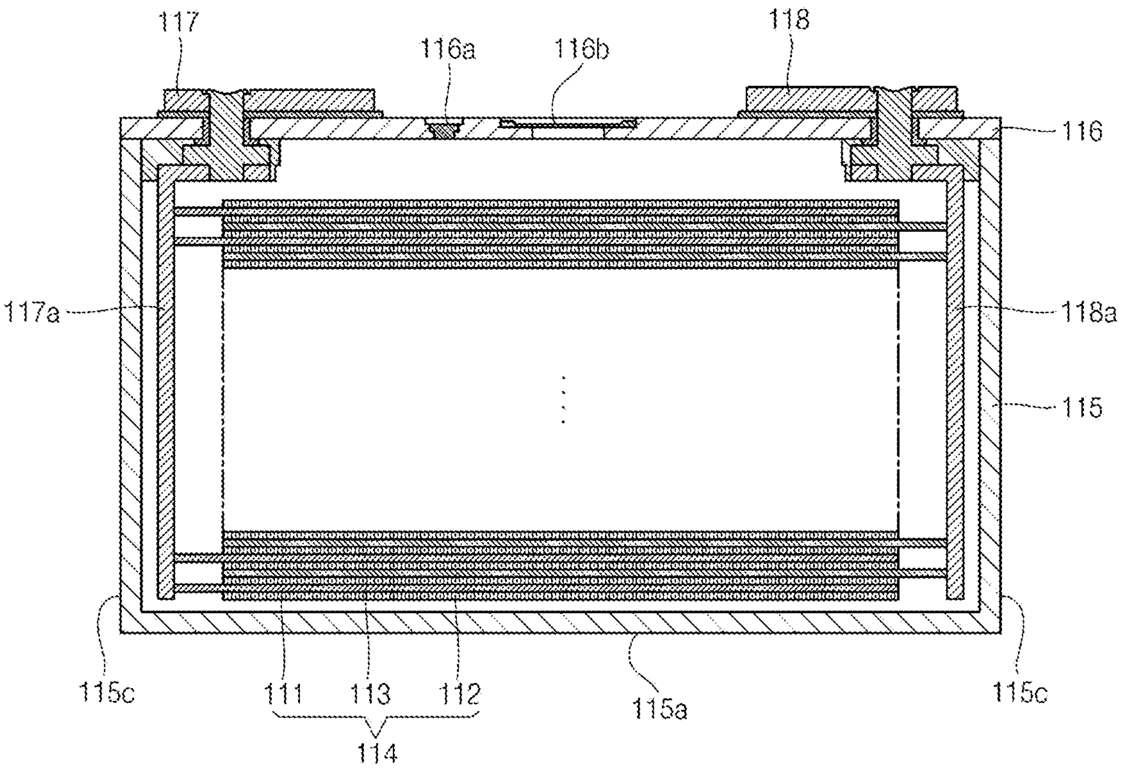
FIG. 2 is a cross-sectional view illustrating a battery cell of the battery module of FIGS. 1A and 1B.

Furthermore, referring to FIG. 2, a cross-sectional view of the battery cell 110 of the battery module 100 is illustrated. Hereinafter, a configuration of the battery cell 110 will be described with reference to FIGS. 1A, 1B, and 2.

The battery cell 110 includes an electrode assembly 114 including a positive electrode plate 111, *a* negative electrode plate 112, and a separator 113 interposed between the positive electrode plate 111 and the negative electrode plate 112, *a* case 115 having a space in which to accommodate the electrode assembly, a cap plate 116 coupled to the case to seal the case, and positive and negative electrode terminals 117 and 118 electrically connected to the positive and negative electrode plates 111 and 112, respectively, protruding to the outside of the cap plate 116.

The positive electrode plate 111 may be provided by applying a positive electrode active material (such as transition metal oxide) to a positive electrode collector made of metal foil (such as aluminum), and includes a positive electrode non-coating portion, on which the positive electrode active material is not applied. The positive electrode non-coating portion may be disposed on a side surface of the positive electrode plate 111 along a longitudinal direction of the positive electrode plate 111 to serve as a passage through which current flows between the positive electrode plate 111 and the positive electrode terminal 117. Here, the positive electrode non-coating portion may protrude to an upper end of the electrode assembly 114, and a protruding direction of the positive electrode non-coating portion is not limited in the present disclosure.

The negative electrode plate 112 may be provided by applying a negative electrode active material (such as graphite and/or carbon) to a negative electrode collector made of a metal foil (such as nickel and/or copper) and includes a negative electrode non-coating portion, on which the negative electrode active material is not applied. The negative electrode non-coating portion are disposed on a side surface of the negative electrode plate 112 along a longitudinal direction of the negative electrode plate 112 to serve as a passage through which current flows between the negative electrode plate 112 and the negative electrode terminal 118. Here, the negative electrode non-coating portion may protrude to an upper end of the electrode assembly 114, but the protruding direction of the negative electrode non-coating portion is not limited in the present disclosure.

The separator 113 is disposed between the positive electrode plate 111 and the negative electrode plate 112 to prevent or reduce short-circuiting, should allow diffusive passage of lithium ions, and may be provided as a single layer or as a composite layer made of polyethylene (PE) (e.g., a polyethylene (PE) layer) coated with polypropylene (PP) and/or ceramic on one or both surfaces of the polyethylene (PE) layer. The material of the separator 113 is not limited in the present disclosure.

The electrode assembly 114 may be provided by winding or stacking the positive electrode plate 111, the negative electrode plate 112, and the separator 113, (which is interposed between the positive electrode plate 111 and the negative electrode plate 112 to electrically insulate the positive electrode plate 111 from the negative electrode plate 112) in a jelly-roll shape.

The case 115 may be made of a conductive metal (such as aluminum, an aluminum alloy, and/or nickel-plated steel) and may have a substantially hexahedral shape having an opening in which the electrode assembly 114, the positive electrode terminal 117, the negative electrode terminal 118, and an electrolyte are accommodated. The case 115 may include a bottom surface 115*a*, two long side surfaces 115*b* extending upward from long sides of the bottom surface 115*a*, and two short side surfaces 115*c* extending upward from short sides of the bottom surface 115*a*. Because the case 115 and the cap plate 116 are illustrated in a state of being coupled to each other, the opening is not shown, but a circumferential portion of the cap plate 116 corresponds to the opening of the case 115 (e.g., prior to assembly). An inner surface of the case 115 is electrically insulated from the electrode assembly 114, the positive electrode terminal 117, and the negative electrode terminal 118 (e.g., by being formed of an electrically insulating material).

The cap plate 116 seals the opening of the case 115 and may be made of the same material as the case 115. In some embodiments, the cap plate 116 may include a plug 116*a*, which blocks an electrolyte injection hole, and a safety vent 116*b*.

The positive electrode terminal 117 is electrically connected to the positive electrode plate 111 and protrudes to the outside of the cap plate 116. Furthermore, the negative electrode terminal 118 is electrically connected to the negative electrode plate 112 and protrudes to the outside of the cap plate 116. The positive electrode plate 111 and the positive electrode terminal 117 may be electrically connected to each other through a positive electrode collecting plate 117*a*. The negative electrode plate 112 and the negative electrode terminal 118 may be connected to each other through a negative electrode collecting plate 118*a*.

In some embodiments, the positive electrode terminals 117 and the negative electrode terminals 118 of each of the plurality of battery cells 110 may be electrically connected to the positive electrode terminals 117 and the negative electrode terminals 118 of adjacent battery cell(s) 110 through a busbar (e.g., respectively). For example, the plurality of battery cells 110 may be connected to each other in series and/or in parallel.

Figure 3A:
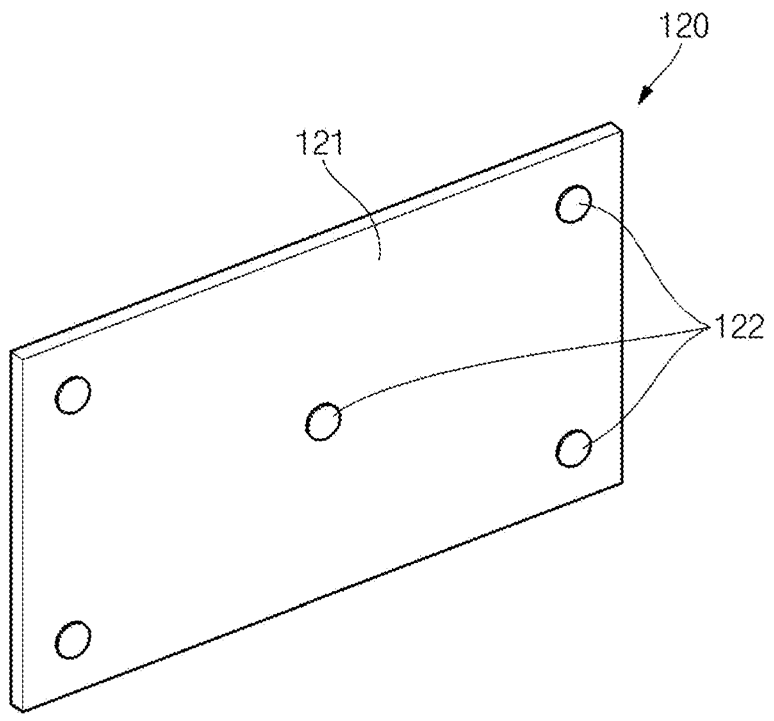
FIGS. 3A and 3B a perspective view and a cross-sectional view illustrating an example of an insulation sheet of the battery module of FIG. 1A and 1B, respectively.
Figure 3B:
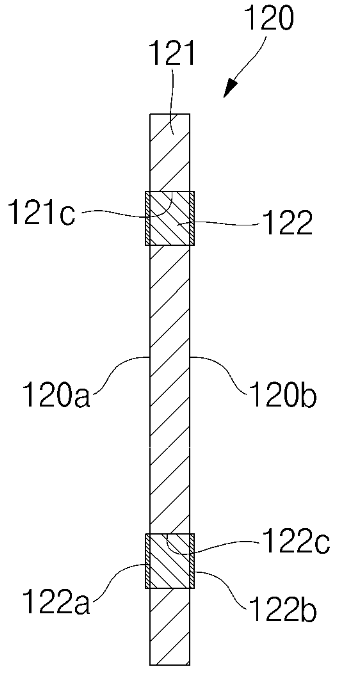

FIGS. 3A and 3B are a perspective view and a cross-sectional view, respectively, illustrating an example of the insulation sheet 120 in the battery module 100 of FIGS. 1A and 1B. Hereinafter, a configuration of the insulation sheet 120 will be described with reference to FIGS. 1A, 1B, 3A, and 3B.

The insulation sheet 120 may have a flat plate shape. The insulation sheet 120 may have a shape corresponding to the long side surface of the battery cell 110. The insulation sheet 120 may include a flat first surface 120*a* and a flat second surface 120*b* that is opposite to the first surface 120*a*. Furthermore, the first surface 120*a* of the insulation sheet 120 may be in contact with the long side surface of one battery cell 110, and the second surface 120*b* of the insulation sheet 120 may be in contact with the long side surface of the other battery cell 110. For example, the insulation sheet 120 may be interposed between the long side surface 115*b* of one battery cell 110 and the long side surface 115*b* of the case 115 of the other battery cell 110. The insulation sheet 120 may have a rectangular plate shape having a set or predetermined thickness.

The insulation sheet 120 may include a heat-insulating sheet 121 that may interrupt heat transfer between the plurality of battery cells 110, and a phase change material 122 filled in a plurality of through-holes 121*c* defined in the heat-insulating sheet 121.

The heat-insulating sheet 121 may be made by mixing a heat-resistant material (such as a ceramic or mica) and a bonding material (as described herein, the mixing ratio of the materials may be provided as a weight ratio described with an assumption that the total weight of the insulation sheet including the bonding material, and excluding the phase change material, provides a basis of 100%).

When the heat-insulating sheet 121 is made of a ceramic, the heat-insulating sheet 121 may include alumina ($Al_2O_3$) and/or silica ($SiO_2$) having high heat-insulation performance. Alumina ($Al_2O_3$) contained in the heat-insulating sheet 121 may be included at a ratio of about 20% to about 55%, and silica ($SiO_2$) may be included at a ratio of about 45% to about 75%. The ratios of alumina ($Al_2O_3$) and silica ($SiO_2$) may be changed as long as the total amount of the base material forming the heat-insulating sheet 121 containing the bonding material is 100%. In some embodiments, the heat-insulating sheet may include alumina ($Al_2O_3$), silica ($SiO_2$), and zirconia ($ZnO_2$). The alumina ($Al_2O_3$) contained in the heat-insulating sheet 121 may be contained at a ratio of about 20% to about 55%, silica ($SiO_2$) may be contained at a ratio of about 45% to about 75%, and zirconia ($ZnO_2$) may be contained at a ratio of about 1% to about 30%. The ratios of alumina ($Al_2O_3$), silica ($SiO_2$), and zirconia ($ZnO_2$) may be changed as long as the total ratio of the base material forming the heat-insulating sheet 121 containing the bonding material is 100%.

In some embodiments, when the heat-insulating sheet 121 is made of mica, the heat-insulating sheet 121 may include insulating alumina ($Al_2O_3$), silica ($SiO_2$), and/or zirconia ($ZnO_2$). In some embodiments, muscovite and/or phlogopite may be included at a ratio of about 70% to about 95% (with the remainder comprising e.g., alumina ($Al_2O_3$), silica ($SiO_2$), and/or zirconia ($ZnO_2$)), the ratios (amounts) of muscovite and phlogopite may be changed so that the total ratio of the base material forming the heat-insulating sheet 121 containing the bonding material is 100%.

The heat-insulating sheet 121 includes a plurality of through-holes 121*c* passing between a first surface and a second surface that is opposite to the first surface. Here, the first surface of the heat-insulating sheet 121 may be substantially the same as the first surface 120*a* of the insulation sheet 120, and the second surface of the heat-insulating sheet 121 may be substantially the same as the second surface 120_b_ of the insulation sheet 120. FIG. 3A illustrates an embodiment in which the plurality of through-holes 121_c_ are defined to be substantially X-shaped on the first surface 120_a_ and the second surface 120_b_ of the heat-insulating sheet 121 (e.g., the plurality of through-holes 121_c_ are arranged to trace the vertices of an X-shape), but the arranged shape may be changed to have various suitable arrangements. As an example, the plurality of through-holes 121_c_ may be defined in a rectangular shape, in a circular shape, in a diamond shape, and along a plurality of longitudinal or transverse lines on the first surface 120_a_ and the second surface 120_b_ of the heat-insulating sheet 121, but the present disclosure is not limited thereto. In some embodiments, a plane shape of the plurality of through-holes 121_c_ may also be changed to a circular, elliptical, or polygonal shape. Further, the number of through-holes 121_c_ may be any suitable number and have any suitable arrangement density, and is not limited to the numbers and densities shown in the drawings.

In some embodiments, the plurality of through-holes 121_c_ may be filled with a phase change material (PCM) 122, which may be to absorb heat while being melted, for example, each of the plurality of through-holes 121_c_ may be filled, or a portion (e.g., some of the plurality) may be filled. In some embodiments, the phase change material may be or include paraffin wax ($C_nH_{2n}$+2, n≥19). In some embodiments, the phase change material 122 may be mixed with a fire extinguishing agent, for example, Novec 1230 (perfluoro(2-methyl-3-pentanone)). The phase change material may have a phase change temperature of about 60° C. to about 80° C., for example as determined by the composition of the paraffin wax, and the fire extinguishing agent may be vaporized at about 100° C. to about 110° C. The phase change material 121 may be in the form of a capsule, and for example, the fire extinguishing agent may be surrounded by the paraffin wax.

The phase change material 122 may be inserted through the plurality of through-holes 121_c_ in the form of a bundle (e.g., capsule, cylinder, or plug) surrounded by a protective film (e.g., including a layer of a protective film on one or both ends of the bundle, or covering the surface of (or around) the bundle). As another example, the phase change material 122 may be injected into the plurality of through-holes 121_c_ in a liquid state and then solidified (e.g., allowed to solidify). In some embodiments, the phase change material 122 may be formed by immersing the heat-insulating sheet 121 having the plurality of through-holes 121_c_ in the PCM that is in a liquid state, extracting the heat-insulating sheet 121 from the PCM, and then solidifying the PCM within the heat-insulating sheet 121.

In some embodiments, if the phase change material 122 does not have the form of the bundle surrounded by the protective film, surfaces 122_a_ and 122_b_ of the phase change material 122, which are exposed at the first surface 120_a_ and the second surface 120_b_ of the insulation sheet 120, may be additionally covered by a protective film 122_c_. The protective film 122_c_ may be attached to areas corresponding to the first surface 122_a_ and the second surface 122_b_ of the phase change material 122 through an adhesive, but the present disclosure is not limited thereto. The protective film 122_c_ may be configured to surround (or be around) the entire phase change material 122 or to cover the surfaces 122_a_ and 122_b_ of the phase change material 122, which are exposed at least at the first surface 120_a_ and the second surface 120_b_ of the insulation sheet 120.

The protective film 122_c_ may be made of the same material as the separator 113 of the battery cell 110. As an example, the protective film may be provided as a single layer made of polyethylene (PE) or as a composite layer made of polyethylene (PE) coated with polypropylene (PP) or ceramic on both surfaces of the polyethylene (PE). The protective film 122_c_ may be melted at a temperature (e.g., may have a melting point temperature) of about 120° C. to about 140° C.

Here, the phase change material 122 may be to absorb heat while being melted (e.g., due to fusion enthalpy) if the temperature of the battery cell 110 that is in contact with the first surface 120_a_ or the second surface 120_b_ of the insulation sheet 120 rises to a first reference temperature or higher. Here, the first reference temperature may be a temperature at which a phase of the phase change material 122 is changed (e.g., from a solid phase to a liquid phase) and may be about 60° C. to about 80° C. Here, the phase change material 122 may be to absorb heat while being melted from a state in which the phase change material 122 is maintained in the plurality of through-holes 121_c_.

Furthermore, if the temperature of the battery cell 110 that is in contact with the first surface 120_a_ or the second surface 120_b_ of the insulation sheet 120 rises to a second reference temperature or more, the protective film 122_c_ may be melted, and the fire extinguishing agent contained in the phase change material 122 may be discharged to the outside of the insulation sheet 120. Therefore, a battery failure or damage event that may be caused in the battery cell 110 by the heat, may be delayed, prevented, and/or reduced by the fire extinguishing agent. Here, the second reference temperature may be a temperature (e.g., the same temperature) at which the protective film 122_c_ is melted, and may be about 120° C. to about 140° C.

Table 1 shows experimental values of thermal conductivity for various insulation sheets.

TABLE 1

| Type or kind of insulation sheet | Thermal conductivity (W/mK) |
|---|---|
| Hole-free insulation sheet | 0.71 |
| Phase change material with 30% of insulation sheet | 0.56 |
| Phase change material with 50% of insulation sheet | 0.46 |
| Phase change material with 70% of insulation sheet | 0.32 |
| Through-hole with 30% of insulation sheet | 0.50 |
| Through-hole with 50% of insulation sheet | 0.36 |
| Through-hole with 70% of insulation sheet | 0.21 |

As shown in Table 1, it is seen that the thermal conductivity is reduced (decreased) if the phase change material 122 is filled in a plurality of through-holes 121_c_ in the insulation sheet 120, compared with a hole-free insulation sheet 120 (Table 1, first entry). The entire phase change material 122 may be filled within the plurality of through-holes 121_c_ of the insulation sheet 120 (e.g., each of the plurality of through-holes 121_c_ may be filled with the phase change material). For example, as a ratio (e.g., coverage percentage) of the plurality of through-holes 121_c_ increases, a ratio (e.g., coverage percentage) of the phase change material 122 filled within the plurality of through-holes 121_c_ increases. Here, the thermal conductivity may be more reduced. When the temperature of the battery cell 110 is higher than that of the phase change material 122, such that the phase change material is melted and discharged from the plurality of through-holes 121*c*, the resulting insulation sheet 120, from which the phase change material 122 is separated, may be provided with only the plurality of through-holes 121*c*. Here, it is seen that even though the phase change material 122 is separated from the insulation sheet 120, the thermal conductivity is more reduced (e.g., further decreased) as the ratio of the plurality of through-holes 121*c* increases. As such, the ratio of the phase change material 122 and the ratio of the through-holes 121*c* (e.g., the proportions of filled and empty through-holes) may be variously changed with respect to the insulation sheet 120.

In the experimental results in Table 1, the insulation sheet 120 is made of mica, and the phase change material 122 is provided in the form of a capsule in which paraffin wax ($C_nH_{2n+2}$(n≥119) is around (e.g., surrounds) a fire extinguishing agent (Novec 1230 (perfluoro(2-methyl-3-pentanone))).

As described above, the battery module 100 may be to absorb heat through the phase change material 122 contained in the insulation sheet 120, and may also reduce thermal conductivity even though a separate cooling device is not provided, thereby preventing or reducing heat transfer between battery cells 110, and delaying, preventing, and/or reducing the event that may be caused by the heat.

Figure 4A:
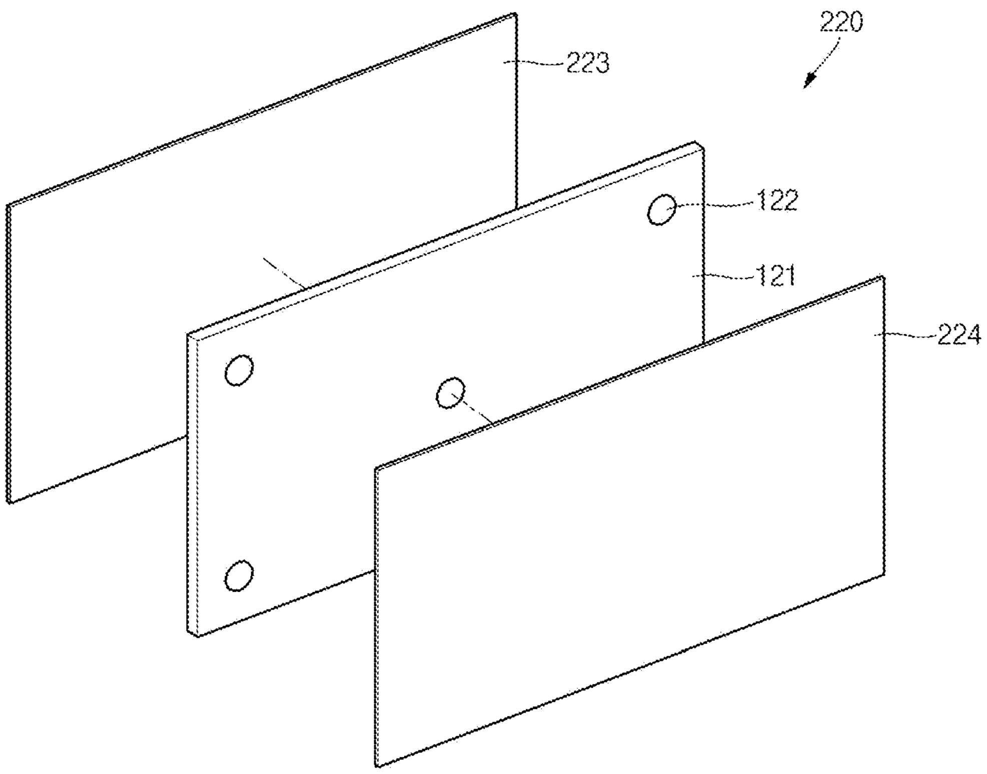
FIGS. 4A and 4B are an exploded perspective view and a cross-sectional view illustrating another example of the insulation sheet in the battery module of FIG. 1A and 1B, respectively.
Figure 4B:
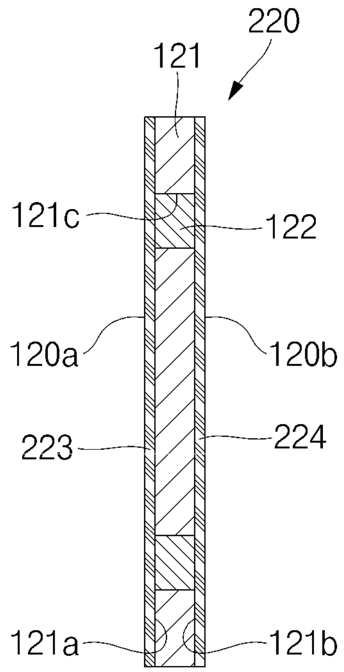

FIGS. 4A and 4B are an exploded perspective view and a cross-sectional view illustrating another example of the insulation sheet in the battery module of FIG. 1A and 1B. Here, the battery module may be constituted by battery cells 110 and insulation sheets 120, like the battery module 100 illustrated in FIGS. 1A and 1B. However, instead of the insulation sheet 120, an insulation sheet 220 illustrated in FIGS. 4A and 4B may include a heat-insulating sheet 121 that may block or reduce heat transfer between the plurality of battery cells 110, *a* phase change material 122 filled in a plurality of through-holes 121*c*, and protective films 223 and 224, which are attached to a first surface 121*a* of the heat-insulating sheet 121 and a second surface 121*b* that is opposite to the first surface 121*a*, respectively. For example, when compared with the insulation sheet 120 illustrated in FIGS. 3A and 3B, the insulation sheet 220 may further include the protective films 223 and 224, which are attached to the first surface 121*a* and the second surface 121*b* of the heat-insulating sheet 121, respectively.

Hereinafter, a configuration of the insulation sheet 220 will be described with reference to FIGS. 1A, 1B, 4A, and 4B.

The insulation sheet 120 may have a flat plate shape. The insulation sheet 120 may have a shape corresponding to a long side surface of the battery cell 110.

The insulation sheet 120 may include a flat first surface 120*a* and a second surface 120*b* that is opposite to the first surface 120*a*. Furthermore, the first surface 120*a* of the insulation sheet 120 may be in contact with the long side surface of one battery cell 110, and the second surface 120*b* of the insulation sheet 120 may be in contact with the long side surface of the other (a second) battery cell 110. For example, the insulation sheet 120 may be interposed between the long side surface 115*b* of one battery cell 110 and the long side surface 115*b* of the case 115 of the other battery cell 110. The insulation sheet 120 may have a square or rectangular plate shape having a set or predetermined thickness.

The heat-insulating sheet 121 and the phase change material 122 may be substantially the same as the insulation sheet 120 illustrated in FIGS. 3A and 3B.

The protective films 223 and 224 may be attached to the first surface 121*a* and the second surface 121*b* of the heat-insulating sheet 121, respectively, through an adhesive or thermal pressing. The protective films 223 and 224 may have sizes and shapes corresponding to the first surface 121*a* and the second surface 121*b* of the heat-insulating sheet 121, respectively. In some embodiments (when used), the adhesive may have a size and shape corresponding to each of the first surface 121*a* and the second surface 121*b* of the heat-insulating sheet 121, and may be interposed between the heat-insulating sheet 121 and the protective films 223 and 224. The protective films 223 and 224 are attached to the first surface 121*a* and the second surface 121*b*, respectively, and even when the phase change material 122 is melted, the phase change material may be maintained in the plurality of through-holes 121*c* of the heat-insulating sheet 121.

The protective films 223 and 224 may be made of the same material as the separator 113 of the battery cell 110. For example, each of the protective films may be independently provided as a single layer made of polyethylene (PE) or as a composite layer made of polyethylene (PE) coated with polypropylene (PP) or ceramic on both surfaces of the polyethylene (PE). The protective film may be melted at about 120° C. to about 140° C.

Here, the phase change material 122 may be to absorb heat while being melted if the temperature of the battery cell 110 that is in contact with the first surface 120*a* or the second surface 120*b* of the insulation sheet 120*b* rises to the first reference temperature or more. Here, the first reference temperature may be a temperature at which the phase change material 122 changes phase, and may be set to about 60° C. to about 80° C. The first reference temperature may be within a temperature range, in which the battery cell 110 is normally operable.

Here, the phase change material 122 may be to absorb heat while being melted in a state of being maintained (e.g., while being retained) in the plurality of through-holes 121*c*.

Furthermore, when the temperature of the battery cell 110 that is in contact with the first surface 120*a* or the second surface 120*b* of the insulation sheet 120 rises to the second reference temperature or more, the protective films 223 and 224 may be melted, and the fire extinguishing agent contained in the phase change material 122 may be discharged to the outside of the insulation sheet 120, and thus the heat-caused event in the battery cells 110 may be delayed, prevented, and/or reduced by the fire extinguishing agent. Here, the second reference temperature may be the temperature at which the protective films 223 and 224 are melted, and may be set to a temperature of about 120° C. to about 140° C.

In some embodiments, a spaced distance of the insulation sheet 120 from the battery cell 110 may increase by a thickness of each of the protective films 223 and 224 if the protective films are melted and removed. In the battery module 100, a pressure decrease corresponding to the thickness of each of the protective films 223 and 224 may compensate for swelling of the battery cells 110 if the protective films 223 and 224 are melted and removed.

Figure 5A:
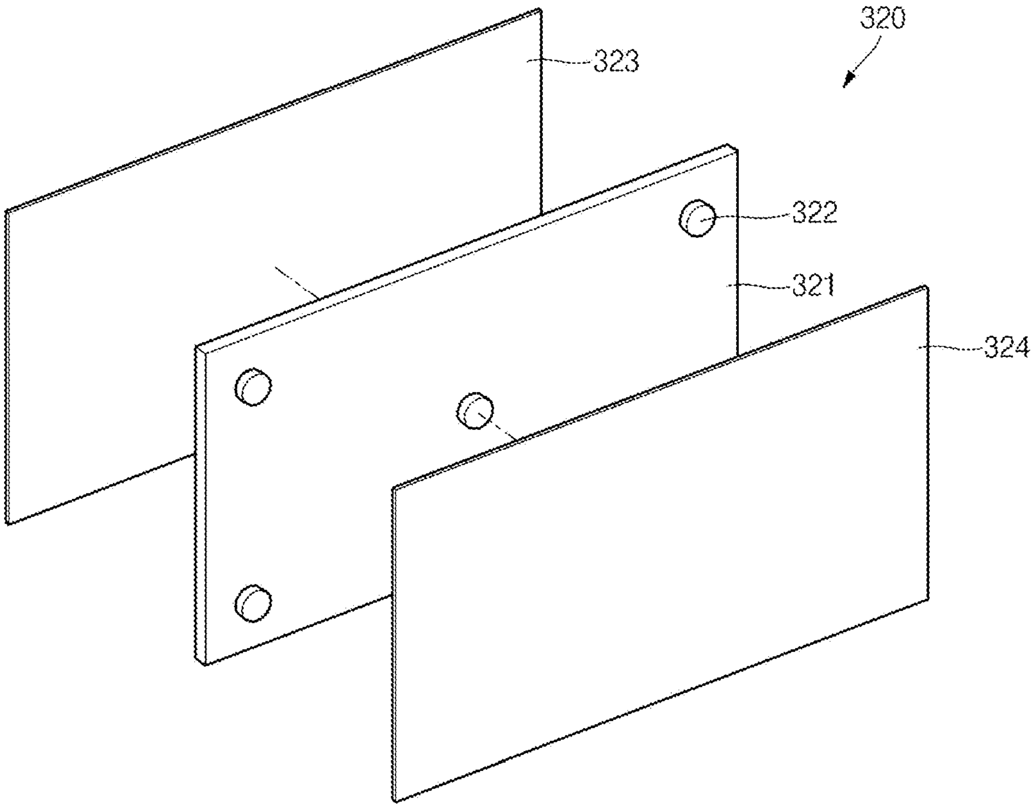
FIGS. 5A and 5B are an exploded perspective view and a cross-sectional view illustrating another example of the insulation sheet of the battery module of FIG. 1A and 1B, respectively.
Figure 5B:
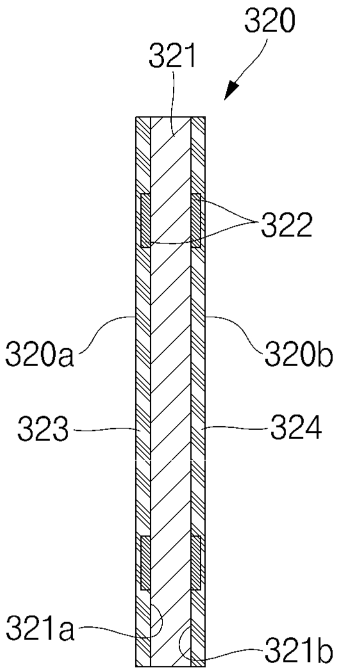

FIGS. 5A and 5B are an exploded perspective view and a cross-sectional view illustrating another example of the insulation sheet in the battery module of FIG. 1A and 1B. Here, the battery module may be constituted by a battery cell 110 and an insulation sheet 120, like the battery module 100 illustrated in FIGS. 1A and 1B. However, instead of the insulation sheet 120, an insulation sheet 320 illustrated in FIGS. 5A and 5B may include a heat-insulating sheet 321 that may block or reduce heat transfer between the plurality of battery cells 110, *a* phase change material 322 including two portions, which are respectively formed on a first surface 321*a* of the heat-insulating sheet 321 and a second surface that is opposite to the first surface 321*a*, and protective films 323 and 324, which are attached to the first surface 321*a* and the second surface 321*b* of the heat-insulating sheet 321 to cover the first surface 321*a* and the second surface 321*b*, respectively.

Hereinafter, a configuration of the insulation sheet 320 will be described with reference to FIGS. 1A, 1B, 5A and 5B.

The insulation sheet 320 may have a flat plate shape. The insulation sheet 320 may have a shape corresponding to a long side surface of the battery cell 110.

The insulation sheet 320 may include a flat first surface 320*a* and a second surface 320*b* that is opposite to the first surface 320*a*. Furthermore, the first surface 320*a* of the insulation sheet 320 may be in contact with the long side surface of one battery cell 110, and the second surface 320*b* of the insulation sheet 320 may be in contact with the long side surface of the other (a second) battery cell 110. For example, the insulation sheet 320 may be interposed between the long side surface 315*b* of one battery cell 110 and the long side surface 315*b* of the case 315 of the other battery cell 110. The insulation sheet 320 may be a rectangular plate shape having a set or predetermined thickness.

The heat-insulating sheet 321 may be made of ceramic, mica, or an equivalent material. A material of the heat-insulating sheet 321 may be substantially the same as that of the heat-insulating sheet 121.

The insulation sheet 321 may include a flat first surface 321*a* and a second surface 321*b* that is opposite to the first surface 321*a* in a shape of a flat plate.

In some embodiments, a plurality of phase change materials 322 in the form of a bundle may be attached to the first surface 321*a* and the second surface 321*b* of the heat-insulating sheet 321, respectively. Here, the phase change material 322 may be to absorb heat while being melted. The phase change material 322 may be substantially the same material as the phase change material 122.

An embodiment is illustrated in which the phase change material 322 is disposed and attached in a substantially X-shape on the first surface 321*a* and the second surface 321*b* of the heat-insulating sheet 321, but the arranged shape may be variously changed. As an example, the phase change material 322 may be disposed in a rectangular shape, in a circular shape, in a diamond shape, and/or along a plurality of longitudinal or transverse lines on the first surface 321*a* and the second surface 321*b* of the heat-insulating sheet 321, but the present disclosure is not limited thereto. The plane shape (arrangement) of the phase change material 322 may also vary to be a circular shape, an elliptical shape, and/or a polygonal shape.

When the protective films 323 and 324 are attached to the first surface 321*a* and the second surface 321*b* of the insulation sheet 321*b* through an adhesive agent or thermal pressing such that the phase change material 322 is temporarily attached to the first surface 321*a* and the second surface 321*b* of the insulation sheet 321, the phase change material 322 may be fixed by the protective films 323 and 324.

The protective films 323 and 324 may have sizes and shapes corresponding to the first surface 321*a* and the second surface 321*b* of the heat-insulating sheet 321, respectively. In some embodiments, the adhesive may have a size and shape corresponding to each of the first surface 321*a* and the second surface 321*b* of the heat-insulating sheet 321 and may be interposed between the heat-insulating sheet 321, and the protective films 323 and 324. Here, the adhesive may not be interposed (present) between the phase change material 322 and the protective films 323 and 324. The protective films 323 and 324 are attached to the first surface 321*a* and the second surface 321*b*, respectively, and the phase change material 322 may be melted, but the phase change material may be maintained in (e.g., between) the protective films 323 and 324 in the form of a bundle.

The protective films 323 and 324 may be made of the same material as the separator 113 of the battery cell 110. As an example, each of the protective films may be provided as a single layer made of polyethylene (PE) or a composite layer made of polyethylene (PE) coated with coating polypropylene (PP) or ceramic on both surfaces of the polyethylene (PE). The protective films may be melted at a temperature between about 120° C. to about 140° C.

Here, the phase change material 322 may be to absorb heat while being melted if the temperature of the battery cell 110 that is in contact with the first surface 320*a* or the second surface 320*b* of the insulation sheet 320 rises to the first reference temperature or higher. Here, the first reference temperature may be a temperature at which the phase of the phase change material 122 is changed, and may be about 60° C. to about 80° C. Here, the phase change material 322 may be to absorb heat while being melted in a state of being interposed between the protective films 323 and 324 and the heat-insulating sheet 321.

Furthermore, if the temperature of the battery cell 110 that is in contact with the first surface 320*a* or the second surface 320*b* of the insulation sheet 320 rises to the second reference temperature or higher, the protective films 323 and 324 may be melted and the fire extinguishing agent contained in the phase change material 322 may be discharged to the outside of the insulation sheet 320, and thus an event, which may be caused in the battery cell 110 by the heat, may be delayed, prevented, and/or reduced by the fire extinguishing agent. Here, the second reference temperature may be the temperature at which the protective films 323 and 324 are melted, and may be about 120° C. to about 140° C.

In some embodiments, a spaced distance of the insulation sheet 320 from the battery cell 110 may increase by a thickness of each of the protective films 323 and 324 if the protective films are melted and removed. For example, in the battery module 300, if the protective films 323 and 324 are melted and removed, a pressure decrease corresponding to the thickness of each of the protective films 323 and 324 may compensate for swelling of the battery cells 110.

Furthermore, the insulation sheet according to the present disclosure may include heat-insulating sheets having one or more suitable shapes.

Figure 6:
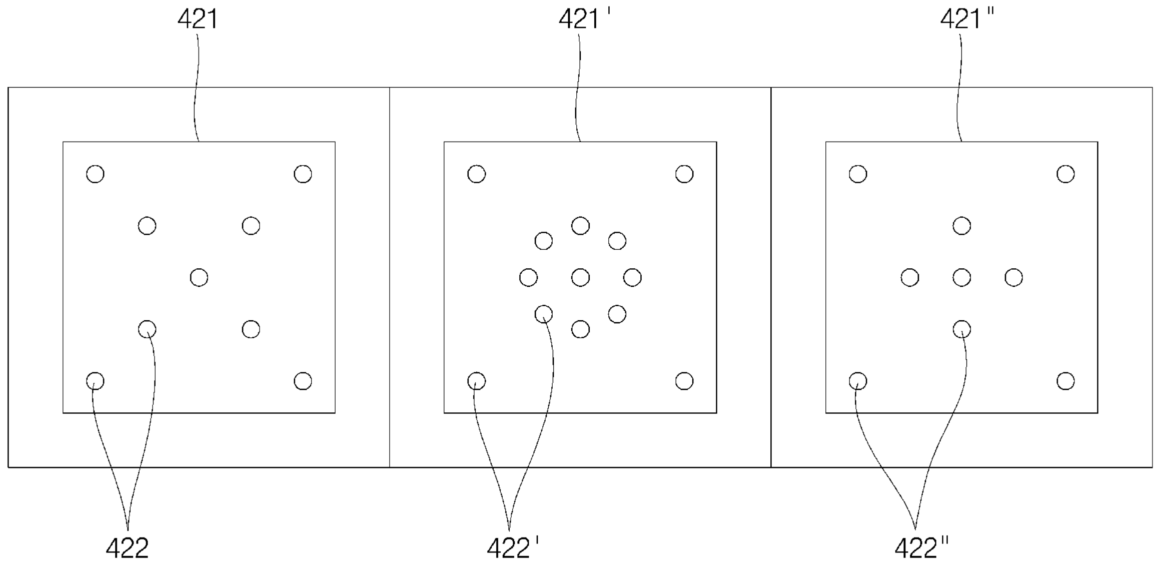
FIG. 6 is a plan view illustrating various examples of a heat-insulating sheet of an insulation sheet according to another embodiment.

FIG. 6 is a plan view illustrating one or more suitable examples of a heat-insulating sheet of an insulation sheet according to another embodiment.

As illustrated in FIG. 6, each of heat-insulating sheets 421, 421' and 421" according to various suitable embodiments may have a form in which the phase change materials (e.g., the arrangement pattern of phase change materials) 422, 422', and 422" is concentrically disposed at a central portion of a battery cell, which releases a relatively large amount of heat. Each of the phase change materials 422, 422', 422" may be disposed in a substantially rectangular shape corresponding to the central portion of the battery cell (see reference numeral 422 of 421) or in other various suitable forms, such as a circular shape (see reference numeral 422' of 421'), or a cross shape (see reference numeral 422" of 421"). Accordingly, the phase change materials may be to absorb heat concentrated in areas of the battery cell in which a large amount of heat is released, reduce thermal conductivity, to prevent or reduce heat transfer between the battery cells, and delay, prevent, and/or reduce an event that may be caused by the heat.

The battery module according to the embodiment may be to absorb the heat through the phase change material contained in the insulation sheet, and may also reduce thermal conductivity to prevent or reduce the heat transfer between battery cells, and to delay, prevent, and/or reduce the event that may be caused by the heat.

As used herein, the terms "substantially," "about," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

The above-described embodiment is simply one embodiment for carrying out the battery module, and the present disclosure is not limited to the embodiment, and the technical spirits of the present disclosure include all ranges of technologies that may be variously modified by an ordinary person in the art, to which the present disclosure pertains, without departing from the essence of the present disclosure as claimed in the following claims and equivalents thereof.

What is claimed is:

1. A battery module comprising:

a plurality of battery cells; and a plurality of insulation sheets interposed between the plurality of battery cells, wherein each of the plurality of insulation sheets comprises:

a heat-insulating sheet having a first surface and a second surface, a plurality of through-holes defined in the heat-insulating sheet, and passing between the first surface and the second surface, opposite the first surface, the plurality of through-holes having identical shapes in a plane defined by the heat-insulating sheet, a phase change material filled in the plurality of through-holes, and a flat plate shape with uniform thickness, the first surface of the heat-insulating sheet being in contact with a long side surface of a first battery cell of the plurality of battery cells and the second surface of the heat-insulating sheet being in contact with a long side surface of a second battery cell of the plurality of battery cells, wherein a perimeter of the first surface of the heat-insulating sheet is equal to a corresponding perimeter of the long side surface of the first battery cell, wherein a perimeter of the second surface of the heat-insulating sheet is equal to a corresponding perimeter of the long side surface of the second battery cell, wherein each of the plurality of insulation sheets further comprises a plurality of protective films attached to the first surface and the second surface of the heat-insulating sheet to cover the phase change material, and wherein the plurality of protective films are separate from each other.

2. The battery module of claim 1, wherein the phase change material is filled into each of the plurality of through-holes defined in the heat-insulating sheet in the form of a bundle surrounded by the protective films.

3. The battery module of claim 1, wherein the plurality of protective films are made of the same material as a separator of the battery cells.

4. The battery module of claim 3, wherein each of the plurality of protective films is a single layer made of polyethylene (PE) or a composite layer made of polyethylene (PE) coated with polypropylene (PP) or ceramic on both surfaces of the polyethylene (PE).

5. The battery module of claim 1, wherein the plurality of protective films each have a size and shape corresponding to the first surface or the second surface of the heat-insulating sheet, and are attached, through an adhesive or thermal pressing, to cover the entire first surface or the entire second surface of the heat-insulating sheet.

6. The battery module of claim 1, wherein the phase change material is in the form of a capsule, the capsule being a material surrounded by paraffin wax to absorb heat while a fire extinguishing agent is melted.

7. The battery module of claim 1, wherein the heat-insulating sheet is made of ceramic or mica.

8. The battery module of claim 1, wherein the phase change material is mixed with paraffin wax and a fire extinguishing agent.

9. The battery module of claim 1, wherein each entire protective film of the plurality of protective films is aligned parallel to the long side surfaces of the first battery cell and the second battery cell.

10. The battery module of claim 1, wherein short side surfaces of the first battery cell are not in contact with any of the protective films.

11. The battery module of claim 1, wherein short side surfaces of the first battery cell are positioned away from each entire protective film of the plurality of protective films.

12. The battery module of claim 1, wherein the protective films are attached to the heat-insulating sheet utilizing an adhesive.

13. The battery module of claim 1, wherein the protective films are configured to cover the phase change material without contacting short side surfaces of the battery cells.

14. A battery module comprising:

a plurality of battery cells, each of the plurality of battery cells comprising an embedded electrode assembly, the embedded electrode assembly comprising a positive electrode plate, a negative electrode plate, and a separator, and the plurality of battery cells being arranged so that long side surfaces thereof are parallel to each other; and a plurality of insulation sheets interposed between long side surfaces of the plurality of battery cells, wherein each of the insulation sheets comprises:

a heat-insulating sheet having a first surface and a second surface opposite the first surface;

a plurality of through-holes defined in the heat-insulating sheet, and passing between the first surface and the second surface opposite the first surface, the plurality of through-holes having identical shapes in a plane defined by the heat-insulating sheet;

a plurality of phase change materials attached to the first surface and the second surface of the heat-insulating sheet in the form of a bundle surrounded by protective films, the protective films being attached to cover the first surface and the second surface of the heat-insulating sheet; and a flat plate shape with uniform thickness, the first surface of the heat-insulating sheet being in contact with a long side surface of a first battery cell of the plurality of battery cells and the second surface of the heat-insulating sheet being in contact with a long side surface of a second battery cell of the plurality of battery cells, wherein a perimeter of the first surface of the heat-insulating sheet is equal to a corresponding perimeter of the long side surface of the first battery cell, wherein a perimeter of the second surface of the heat-insulating sheet is equal to a corresponding perimeter of the long side surface of the second battery cell, and wherein the protective films are separate from each other.

15. The battery module of claim 14, wherein the protective films are made of the same material as the separator, and each of the plurality of phase change materials is provided in the form of a capsule, the capsule being a material surrounded by paraffin wax to absorb heat while a fire extinguishing agent is melted.

* * * * *